United States Patent [19]

Trevisan

[11] Patent Number: 5,421,885
[45] Date of Patent: Jun. 6, 1995

[54] POWDERED-PAINT SPRAYING PLANT WITH VARIABLE-SECTION BOOTH

[76] Inventor: Ferdinando Trevisan, Via Meucci, 4, 37135 Verona, Italy

[21] Appl. No.: 153,410

[22] Filed: Nov. 17, 1993

[30] Foreign Application Priority Data

Nov. 20, 1992 [IT]  Italy ............................... VR92A0102

[51] Int. Cl.6 .......................................... B05B 15/12
[52] U.S. Cl. .................................... 118/308; 118/316; 118/312; 118/326; 454/50
[58] Field of Search .................... 118/308–310, 118/312, 316, 326, DIG. 7; 454/50, 53, 63

[56] References Cited

U.S. PATENT DOCUMENTS

| | | | |
|---|---|---|---|
| 4,662,309 | 5/1987 | Mulder | 118/308 |
| 4,730,647 | 3/1988 | Mulder | 118/308 |
| 4,789,569 | 12/1988 | Douche et al. | 118/308 |
| 4,924,803 | 5/1990 | Celant | 118/630 |
| 4,932,316 | 6/1990 | Joseffson | 454/50 |
| 5,078,090 | 1/1992 | Richman | 118/308 |
| 5,149,373 | 9/1992 | Gondrand | 118/309 |
| 5,201,954 | 4/1993 | Holt | 118/309 |
| 5,240,504 | 8/1993 | Mazakas | 118/309 |
| 5,256,201 | 10/1993 | Gelain et al. | 118/309 |

FOREIGN PATENT DOCUMENTS

| | | |
|---|---|---|
| 0223660 | 5/1987 | European Pat. Off. . |
| 0369478 | 5/1990 | European Pat. Off. . |
| 2332067 | 6/1977 | France . |
| 1359887 | 7/1974 | United Kingdom . |
| 2141642 | 1/1985 | United Kingdom . |
| 8700771 | 2/1987 | WIPO . |

OTHER PUBLICATIONS

WPI Abstract Accession No. 88-162403/24.
De 3 640699 A(Ransburg-Gema) Sep. 1, 1988.

Primary Examiner—James C. Housel
Assistant Examiner—Rachel Heather Freed
Attorney, Agent, or Firm—Guido Modiano; Albert Josif

[57] ABSTRACT

Plant for the powdered-paint spraying of pieces to be painted, comprising a spraying booth with replaceable walls of the disposable type and a unit for feeding and recovering the paint that has not deposited on the pieces to be painted. The booth comprises a supporting frame which delimits a spraying chamber having at least two walls or half-booths which are arranged mutually opposite, have replaceable sheets and are movably mounted with respect to one another for moving mutually closer and further apart to vary the section of the spraying chamber according to the width of the pieces to be painted.

20 Claims, 3 Drawing Sheets

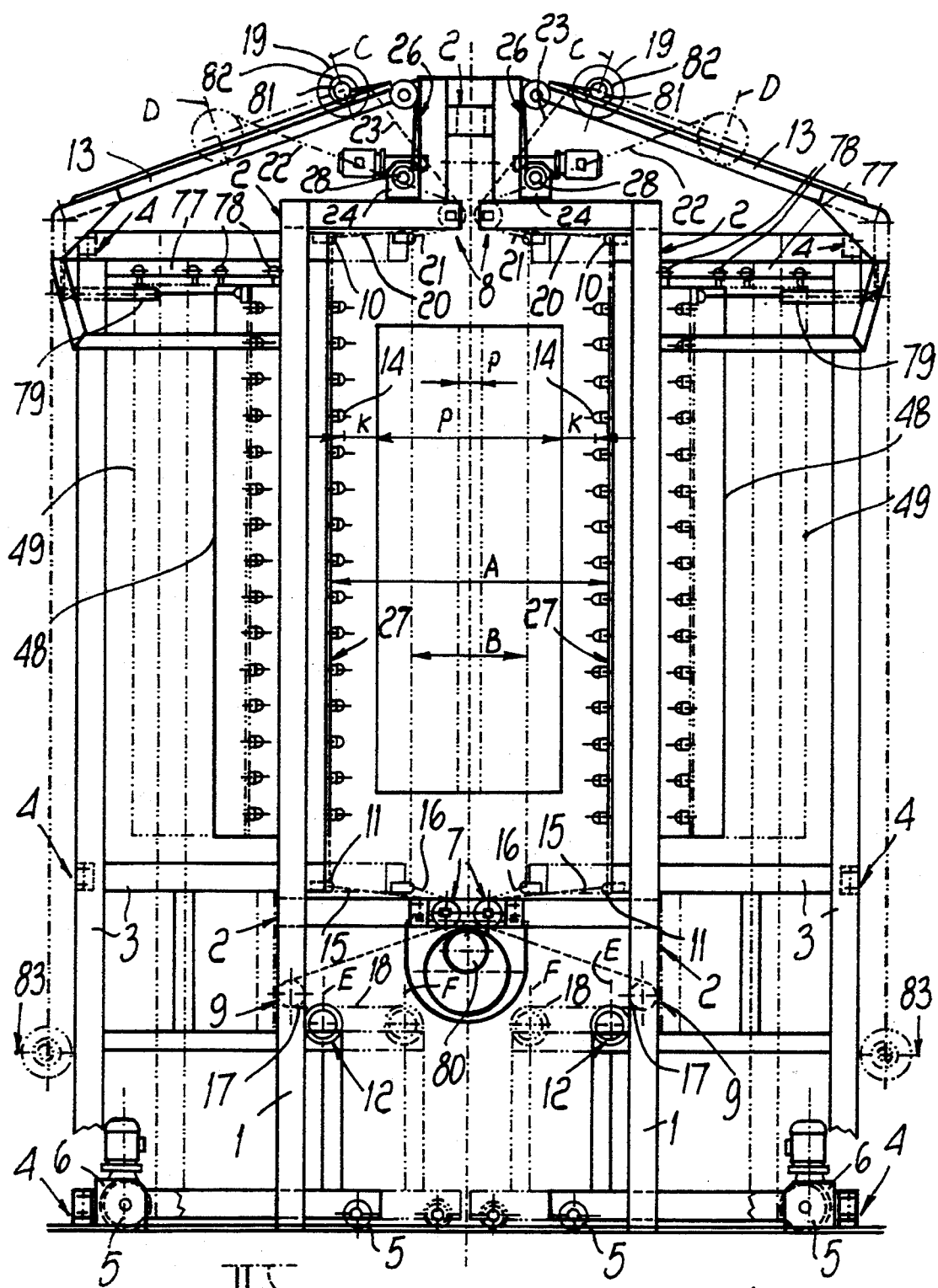
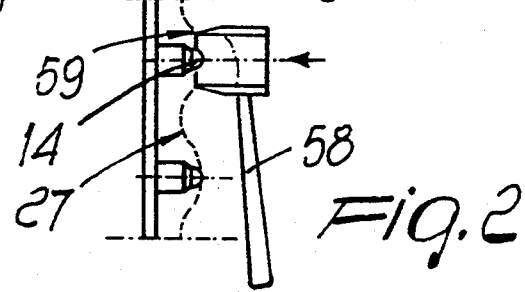
Fig.1
Fig.2

POWDERED-PAINT SPRAYING PLANT WITH VARIABLE-SECTION BOOTH

BACKGROUND OF THE INVENTION

The present invention relates to a powdered-paint spraying plant with variable-section booth.

Currently, the greatest problem involved in using powders in industrial painting lies in the need to completely clean all the equipment used every time a color change is required. This cleaning operation requires the stoppage of the plant for the time necessary to perform accurate cleaning.

The direct consequences of this are long downtimes, with a considerable decrease in plant productivity, an increase in running costs and a lower quality of the painted surfaces caused by damage-producing loitering of the pieces along the overhead chain conveyor inside the pretreatment tunnels and in the polymerization ovens.

In order to at least partially obviate the downtimes caused by color changing, it has already been proposed to resort to some contrivances: for example, prescheduling is performed with the aim of grouping into batches all pieces having the same color.

However, this type of scheduling entails the need to mix different orders in favor of color groupings.

It has also been suggested to purchase multiple painting booths with the associated accessory equipment (reciprocators, dispensers, feeders etc.) in order to use each painting plant for just one specific color.

Although this solution is satisfactory from the technical point of view of painting quality, it entails an enormous investment, requires the availability of a very large space to be devoted to the plants and in any case can be used for a rather limited number of colors (no more than two or three).

Furthermore, if the various components of each painting plant are arranged in parallel, the overhead conveyors must be of the two-rail type. Such conveyors cost up to three times as much as conventional single-rail conveyors.

Furthermore, third-party painting firms, in order to satisfy their various clients, must be able to provide a very wide range of colors. They are therefore forced to paint small batches with waste, i.e. without being able to recover the overspray paint, to avoid the drawbacks of plant halting due to color changing. All these problems have not been solved yet, also because spraying devices and booths are currently manufactured by a small number of specialized manufacturers.

In practice, therefore, it is extremely difficult to achieve the optimum conditions required to reduce downtimes.

SUMMARY OF THE INVENTION

The aim of the present invention is to provide a new painting plant which can solve all the above mentioned problems and particularly eliminate or drastically reduce downtimes involved in color changing, with the additional possibility of running the plant automatically according to the pieces to be painted.

With this aim in view, as well as other objects which will become apparent hereinafter, there is provided, according to the present invention, a plant for the powdered-paint spraying of pieces to be painted, which comprises a spraying booth with replaceable walls of the disposable type and a unit for feeding and recovering the paint that has not deposited on the pieces to be painted, wherein said booth comprises a supporting frame which delimits a spraying chamber having at least two walls or half-booths which are arranged mutually opposite, have replaceable sheets and are movably mounted with respect to one another for moving mutually closer and further apart to vary the section of the spraying chamber according to the width of the pieces to be painted.

BRIEF DESCRIPTION OF THE DRAWINGS

Further characteristics and advantages of the powdered-paint spraying plant according to the present invention will become apparent from the following detailed description of a currently preferred embodiment thereof, given merely by way of non-limitative example with reference to the accompanying drawings, wherein:

FIG. 1 is a schematic front elevation view of a powdered-paint spraying booth according to the invention;

FIG. 2 is an enlarged-scale view of a detail of FIG. 1;

DESCRIPTION OF THE PREFERRED EMBODIMENTS

Figure 3:
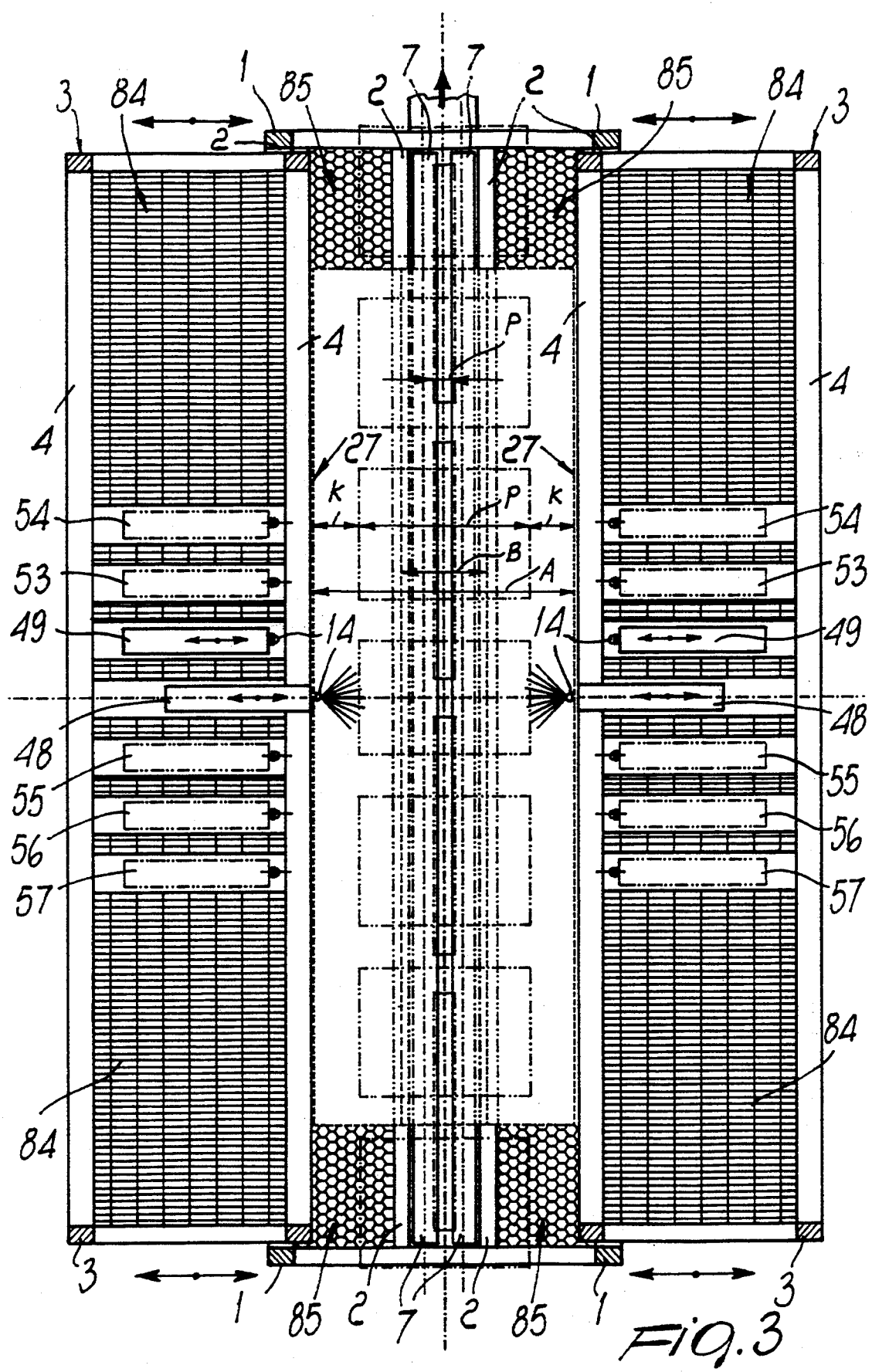
FIG. 3 is a sectional plan view of the booth of FIG. 1.

With reference to the above figures, a powdered-paint spraying plant according to the present invention comprises a spraying booth divided into three distinct and independent pieces. A central body, comprising two heads or uprights (1) and longitudinal horizontal connecting members (2), forms the fixed part of the assembly. The movable part is constituted by the lateral left and right walls or half-booths, which are also constituted by two vertical heads (3) and by a number of longitudinal horizontal connecting members (4), and can move toward or away from the central body, synchronously with one another or independently, by means of floor-touching wheels (5) driven for example by a respective gearmotor (6).

Division of the booth into three parts allows to change its useful width according to the dimensions of the pieces to be painted (P=wider piece, p=narrower piece).

The central body supports, in a fixed position, lower rollers (7), upper rollers (8) and lower lateral guiding rollers (9). The lateral half-booths instead support upper (10) and lower (11) cables as well as sheet receiving or takeup rollers (12). When the lateral half-booths are moved closer to the axial vertical plane of the fixed booth, the lateral walls move from the maximum-width distance (A) to the minimum-width distance (B). This movement occurs with no sliding between the lateral walls formed by the sheets (27) and the nozzles (14) penetrating them, since two automatic tension compensation systems are provided.

The lower sheet portion (15) becomes shorter, i.e. like the portion (16), when the half-booths delimit an opening having the width (B).

The difference between these two portions is the length of sheet to be taken up to keep the tension of said sheet constant during the movements of the half-booths. The takeup roller (12) can move from position (E) to position (F) together with the half-booth, so that the portion (17) can become longer, i.e. like the portion (18), which is equal in length to the difference between the portions (16) and (15). Accordingly, by means of the fixed guiding rollers (9) and of the movable takeup rollers (12) tension is compensated automatically in the lower part of the booth.

As regards the upper part, tension compensation is achieved by moving the respective sheet supply roll loaded with sheet (19) from position (C) to position (D) by an extent equal to the difference between the portions (20) and (21). The difference between the portions (20) and (21) is equal to the difference between the portions (22) and (23).

In order to move the roll (19), the movement of the gearmotor (24) and the movement of the half-booth produced by the gearmotor (6) are synchronized.

In the example shown, any movement of the half-booth is matched by a rotation of the takeup reel (28) that takes up the cable (26) which is such as to ensure matching of the movement of the half-booth and of the takeup of the difference in the portions (20) and (21). Automatic compensation of the tension in the upper part of the booth is thus achieved.

The possibility of varying the internal useful width of the booth entails the following advantages:

A) The distance K of the dispensers or spraying nozzles (14) from the pieces remains constant (as required by ideal spray painting).

B) Template screens at the entrance and at the exit (indispensable with conventional booths) are no longer required, and the associated cleaning time is thus eliminated.

C) Efficiency in retaining the powder inside the booth is increased, since the speed of the aspirated air increases as the passage section of the entry and exit openings decreases. This markedly improves the conditions of the working environment, drastically reducing the causes of pollution.

D) It becomes possible to use even an asymmetrical booth capable of ensuring a constant distance K of the spraying nozzles (14) from the surface to be painted, even in the case of parts having one or more lateral protrusions. Each lateral half-booth (3), in other words, can be moved independently closer to, or further away from, the pieces to be painted.

E) It becomes possible to automatically adapt the width of the booth to the width of the pieces to be painted. This automatic adjustment can be performed by means of readers, for example of the type using photoelectric cells.

The lateral half-booths (3) are equipped with two or more sets of twin dispensers, for example (48), (49), (53), (54), (55), (56) and (57), which are suspended from a respective horizontal guide (77) with sliding wheels (78) interposed, so that they become independently movable regardless of the position assumed by the lateral half-booths. This movement can occur for example by means of a fluid-actuated piston-and-cylinder unit (79) for each dispenser device.

The devices used to achieve rapid color changes are schematically constituted by a feeder which feeds the powder to two sets of oppositely located dispensers arranged vertically along the entire useful height of the pieces to be painted, and can advantageously be of the type described and illustrated in Italian patent application No. VR 91A000108 filed on Dec. 11, 1991 in the name of the same Applicant.

The choice of such an arrangement allows to eliminate conventional reciprocators and allows to have more room available in a longitudinal direction; this room can be used for manual retouching or to install multiple dispenser devices. Furthermore, this layout allows to unify into just four commands the adjustments for:

nozzle placement;
amount of powder to be sprayed;
value of the voltage at the nozzles; and
air flow-rate, making the entire assembly easy to automate.

The commands are sent simultaneously to all the nozzles (14) of the active twin sets.

A conical collection tray (80) arranged in the central lower part of the fixed booth (FIG. 4) acts as intake for the air mixed with paint to be recovered, which is conveyed through the pipes (28) into one or more centrifugal separators (29) for trapping the powder. Centrifugal separators, as is known, trap the powder, which accumulates in their lower conical part (30), whereas the air, purified for example up to 95-99%, is sent by means of a pipe (31) to a final baghouse (32).

The powder that is not trapped in the centrifugal separator or separators (29) is trapped by the filter (32) and collected in collection containers (33).

A fan (34) aspirates the filtered air and expels it into the atmosphere.

In most cases, the centrifugal separators (29) cannot discharge the powder directly into the feeders of the nozzles (14), since this would require the availability of an excessively high space, and this is almost always unfeasible in practice. The problem thus arises of returning the powder recovered in the centrifugal separators from the region (30) to the feeder (35).

Various powder recovery systems can be adopted; the most advantageous is currently considered to be the one entailing the use of a Venturi-effect pump. However, the use of Venturi pumps, while solving the problem of paint transfer, entails the need to disassemble and reassemble the pumps to clean them.

In order to avoid these operations, which entail a considerable waste of time, and to achieve some important advantages described hereinafter, provisions have been made for the installation of an auxiliary fan (36). Therefore, in order to transfer the powder from the region (30) of the centrifugal separator or separators to the feeder (35) there are pipes (37) meant to convey the powder into a small intermediate centrifugal separator (38), which is kept at a negative pressure by an additional fan (36) which in turn discharges the air into the filter (32) by means of a first discharge pipe (60) or directly outside by means of a second discharge pipe (39).

The fan (36) must naturally be able to create a more intense negative pressure than the negative pressure occurring in the centrifugal separator or separators (29), otherwise it would not be possible to transfer the powder from the region (30) to the centrifugal separator (38) through the pipes (37).

The centrifugal separator (38) traps the powder drawn into it through the pipes (37) and accumulates it in its lower part; however, it cannot discharge it, since it is continuously under an intense negative pressure produced by the fan (36). Discharge can be performed by means of the valves (40) and (41), which by opening and closing alternately and automatically allow indeed to discharge the powder, provided that one of said two valves is closed; i.e., when one valve is closed the other one must be open, and vice versa. When the valve (40)

opens, the valve (41) is closed, so that outside air cannot be drawn into the centrifugal separator (38), whereas the powder enters the pipe (42); then the valve (40) closes and the valve (41) opens, allowing the powder to discharge downward by gravity. The valve (40) naturally does not allow air to enter the centrifugal separator (38), and so on.

The powder discharged by the valve (41) falls into a vibrating screen (43) that retains any impurities, and ends in the feeder (35), from which it is then removed by means of a variable-speed screw feeder (44) that conveys it into a Venturi pump (45) that mixes the paint powder with air and sends it to the dispensers by means of the pipes (46).

The operating sequence for quick cleaning that allows to reduce downtimes caused by color changes is now described.

Assume, for example, that the booth is painting in white and that it is necessary to change color and use black.

1) First of all it is necessary to interrupt the removal of the white powder from the feeder (35). The movement of the screw feeder (44) is thus stopped.

2) The vibrators (47) on the centrifugal separators (29) are started; they have the purpose of vibrating their lower cone and of making any white powder deposited on their internal surface drop. The residues of powder are then conveyed into the feeder (35) which contains white paint through the outlets (30), the ducts (37), the centrifugal separator (38), the valve (40), the duct (42), the valve (41) and the vibrating screen (43).

3) The Venturi pump (45) is stopped, so that the pipes (46) and the dispensing devices (48) become inactive, although they are still internally soiled with white paint.

4) The dispensing devices (48) (white) are moved outward by means of the respective cylinders (79) (FIG. 1).

5) The sheets (27) soiled with white paint are lowered and rolled up, and then the internal surfaces of the booth are renewed.

6) The twin dispensing devices (49), which have been prepared in clean condition beforehand, are made to advance and inserted.

7) The device for the automatic control of the alternating opening and closing of the valves (40) and (41) is stopped, setting the valve (40) in open position and the valve (41) in closed position.

8) The valve (53) is opened and the valve (50) is closed. In this manner, the fan (36), by aspirating through the pipe (64), produces entrapment in the centrifugal separator (51), which discharges the trapped powder into the collection container (52). The air that leaves the centrifugal separator (51) is clean when it enters the fan (36).

9) The tension cables (10) and (11) and the sheets (27) of the booth are manually cleaned by blowing compressed air or by aspiration (i.e., the residues of white powder left on the cables are removed and the collection tray (80) is cleaned by blowing, if necessary).

10) The sheets are perforated at the nozzles (14) of the dispensing device (49) by means of a simple cylindrical hammer shown in FIG. 2 and described hereinafter.

Figure 4:
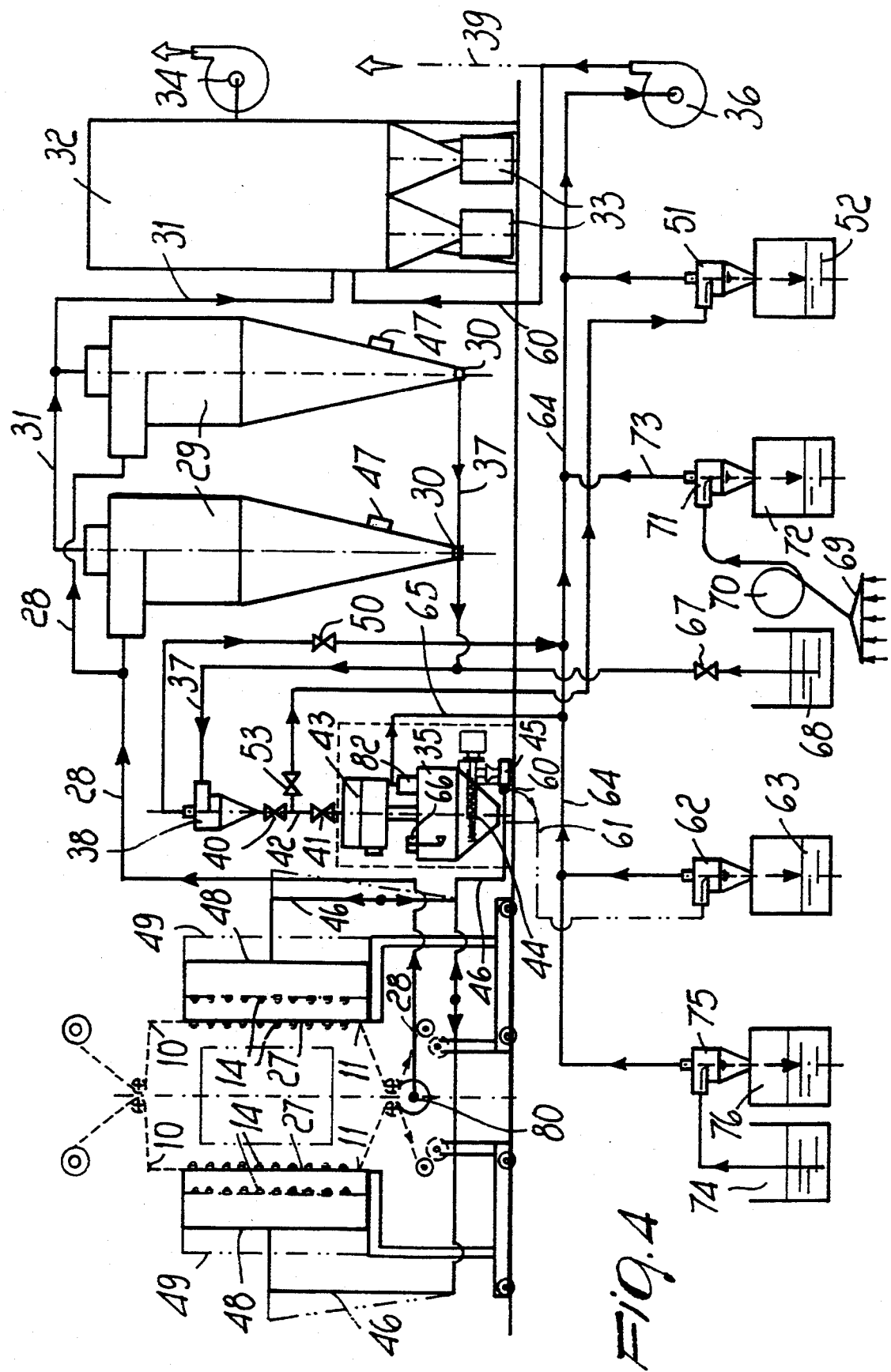
FIG. 4 is a schematic view of a complete powdered-paint spraying plant using a variable-section booth.

11) The unit constituted by the vibrating screen (43), by the feeder (35), the screw feeder (44) and by the Venturi pump (45), which is surrounded by a dashed line in FIG. 4 and contains white paint, is entirely replaced with another twin unit equipped for black paint.

12) The Venturi pump (45) (black) is activated and removal of the powder from the feeder by means of the screw feeder (44) resumes.

13) For a few seconds, the new dispensing unit (49) sprays into the booth black powder which is moved through the circuit formed by the nozzles (14), the conical collection tray (80), the pipe (28), the centrifugal separators (29), the outlets (30), the pipe (37), the centrifugal separator (38), the valve (40), the valve (53), the centrifugal separator (51), and the collection container (52). The container (52) thus receives, for a few seconds, waste black powder possibly including particles of residual white powder to ensure maximum cleaning of the circuit, which is from then onward fed with black paint instead of white paint.

14) The automatic device for opening and closing the valves (40) and (41) is reactivated and the valve (53) is simultaneously closed; the valve (50) is also opened and the vibrators (47) are stopped.

At this point, the normal painting circuit is reactivated for black paint along the feeder (35), the screw feeder (44), the pump (45), the pipe (46), the units (49), the nozzles (14), the collection tray (80), the duct (28), the centrifugal separators (29), the outlets (30), the pipes (37), the centrifugal separator (38), the valve (40), the duct (42), the valve (41) and the vibrating screen (43).

The above described operating sequence allows to change color in a very short time (4 minutes) involving just two people for 2 minutes, avoiding any form of contamination between one color and the next.

For the sake of greater clarity in description, a color change based on just two colors—white with dispensing devices (48) and black with dispensing devices (49)—has been described. FIG. 3, however, illustrates other twin dispensing devices (53), (54), (55), (56), (57) which can be adopted for an equivalent number of different colors.

The use of a series of pairs of dispensing devices allows to eliminate the need to clean said dispensing devices and their pipes at every color change, and this allows to drastically reduce plant downtimes.

The walkways (84) allow the assigned personnel to access the dispensing devices in order to clean them offline, whereas the walkways (85) allow entry in the booth to perforate the sheets (14) and to clean the cables (10) and (11).

The fixed central body (1) of the booth is also equipped with a device for replacing the rolls (19). With reference to FIG. 1, it can be seen that the feeder rolls (19) are supported at the top of the booth and are therefore difficult to reach, and that, since these rolls are relatively heavy and bulky, their loading into working position (C) and their replacement when used up might be difficult.

The replacement device provides automatic lowering of the used roll to the ground, its replacement with a new roll and its automatic lifting into the operating position (c).

The fixed central body (1) supports two cantilevered guides (13) on which the roll (19) can slide since it is supported by a central axis (81) having two wheels or pulleys (82) at its ends.

The metal cables (26) retain the roll (19) and are in turn wound around a reel (28) which is driven by a respective gearmotor (24). During the lowering operation the rolls (19) therefore assume the lowered position (83), which is extremely comfortable for their replacement.

The device thus allows to replace the rolls simply, safely and with a limited space occupation, avoiding dangerous manual interventions and in a very short operating time.

The above described sequence of operations can be fully automated, both in its sequential succession and in its execution times, by adopting suitable control and actuation means, for example a PLC and the like, and suitable servo controls, limiting manual interventions to a minimum. For example, the indispensable manual intervention that requires the longest time, i.e. 10-20 seconds for all the nozzles (14), is the one devoted to perforating the sheets (27) to allow the nozzles (14) to enter the painting area.

With reference to FIG. 2, there is a light hollow cylindrical hammer (58) the internal diameter whereof is larger than that of the nozzles (14). It is sufficient to strike each nozzle (14) once to obtain a perfect hole or opening (59) in the sheet (27) and allow the nozzle (14) to enter the painting area.

It can also be noted that installation of the fan (36), FIG. 4, allows to achieve the following advantages.

a) Rapid cleaning of the dispensing devices and of the associated pipes (46). It is in fact possible to disconnect the end (60) of the pipe (46) from the Venturi pump (45) and connect it to the pipe (61). After moving the dispensing devices (48) backward, compressed air is injected into the individual dispensing nozzles (14), and the air-powder mixture that internally soils the dispensing devices (48) and the pipes (46) is drawn into the centrifugal separator (62), which traps all the powder and deposits it in the container (63). The air passes through the pipe (64), is drawn toward the fan (36) and then directed toward the filter (32) through the pipe (60) or toward the outward discharge (39).

As can be seen, this cleaning operation occurs without interfering at all with the normal operation of the booth, so that it is not necessary to stop the plant to perform it.

b) Negative pressure in the feeder.

In order to avoid possible escape of powder from the feeder (35) when it is necessary to open it for inspection or manual refilling, a pipe (65) has been applied; said pipe is connected to the fan (36) by means of the pipe (64). The feeder (35) is thus subjected to a slight negative pressure. The air intake (82) is equipped with a baghouse that allows to aspirate air by negative pressure but not the powder contained in the feeder (35).

c) Automatic refilling of the powder used in the feeder.

In the feeder (35) there is a level control and indication device (66) which opens and closes the valve (67). When the level of the powder in the feeder (35) decreases due to normal consumption, it is automatically restored by drawing the paint from the tank (68), the valve (67), the pipe (37), the centrifugal separator (38), the valve (40), the pipe (42), the valve (41) and the vibrating screen (43).

d) Floor cleaning and other vacuum-cleaning services.

In order to have one or more vacuum cleaners suitable to clean floors or other devices, the installation of one or more assemblies composed of a brush, a centrifugal separator, a collection container and a filter has been devised as follows. The brush (69) aspirates, through the flexible hose (70) which adapts to any position and conveys air and powder to the centrifugal separator (71), which deposits the solid particles in the closed container (72), the air then passes through the pipe (73) before reaching the fan (36) by means of the pipe (64).

e) Transfer from one container to another.

In order to easily transfer any amount of powder from one container to another without creating unhygienic clouds of powder in the working environment, the fan (36), by means of the pipe (64), draws the powder contained in the open bag (74) into the centrifugal separator (75), which deposits it in the container (76). The air ends in the suction tube (64) and reaches the fan (36).

The powdered-paint spraying plant described above is susceptible to numerous modifications and variations within the protective scope defined by the content of the following claims.

I claim:

1. Adjustable section powdered-paint spraying booth comprising;

a fixed central body (1, 2) including ground-resting uprights (1) and connecting members (2), said connecting members (2) extending substantially horizontally between said uprights (1);

two movable lateral walls (3, 4) located at opposite sides of said fixed central body (1, 2) and each including heads (3), longitudinal connecting members (4), and replaceable disposable sheets (27), said heads extending substantially parallel to said ground-resting uprights (1), said longitudinal connecting members (4) extending substantially parallel to said connecting members (2) and being connected to said heads (3), said sheets (27) being connected to said fixed central body (1, 2) and extending over said movable lateral walls (3, 4);

a plurality of paint-spraying nozzles (14) connected to said lateral walls (3, 4) and penetrating said sheets (27), and;

means (5, 6, 24) for tensioning said sheets (27) including motorized means (5, 6) for synchronously laterally moving said lateral walls (3, 4) towards and away from said fixed central body (1, 2).

2. Adjustable section powdered-paint spraying booth according to claim 1 further comprising;

sheet supply rolls (19) connected to said fixed central body (1, 2);

lower rollers (7) and upper rollers (8) connected to said central body (1, 2), and;

sheet-receiving rollers (12) connected to said movable lateral walls (3, 4);

wherein said sheets (27) each extend from one of said sheet supply rolls (19), over one of said upper rollers (8) and over one of said lower rollers (7), to one of said sheet-receiving rollers (12), and wherein said means (5, 6, 24) for tensioning said sheets (27) comprise motor means (24) for moving said sheet supply rolls (19) with respect to said central body (1, 2).

3. Adjustable section powdered-paint spraying booth according to claim 2, wherein said motor means (24) for moving said sheet supply rolls (19) with respect to said central body (1, 2) are synchronized with said motorized means (5, 6) for synchronously laterally moving said lateral walls (3, 4) towards and away from said fixed central body (1, 2).

4. Adjustable section powdered-paint spraying booth according to claim 2, further comprising cantilevered guides (13) connected to said fixed central body (1, 2), each of said sheet supply rolls (19) having a central axis (81) and ends bearing wheels (82), said wheels (82) being rotatable about said central axis (81) and movable along said cantilevered guides (13) for facilitating replacement of said sheet supply rolls (19).

5. Adjustable section powdered-paint spraying booth according to claim 4, further comprising cables (26) and reels (28), said reels (28) being connected to said motor means (24), said cables (26) supporting said sheet supply rolls (19) and being windable on said reels (28) upon actuation of said motor means (24).

6. Adjustable section powdered-paint spraying booth according to claim 1, further comprising a feeder (35) for feeding powdered paint to said plurality of paint-spraying nozzles (14), an intake (80) for paint to be recovered located downwardly within said central body (1, 2), a centrifugal separator (29) connected to said intake (80), a filter (32), and an air conveyance pipe (31) connecting said centrifugal separator (29) to said filter (32).

7. Adjustable section powdered-paint spraying booth according to claim 6, further comprising a fan (34) for expelling filtered air from said filter (32), an intermediate centrifugal separator (38) connected to said filter (32), pipes (37) for connecting said filter (32) to said feeder (35) via said intermediate centrifugal separator (38), an auxiliary fan (36) for maintaining a negative pressure within said intermediate centrifugal separator (38) for transferring powdered-paint collected at said filter (32) to said feeder (35), and air discharge means (39, 60) connected to said auxiliary fan (36).

8. Adjustable section powdered-paint spraying booth according to claim 7, wherein said air discharge means (39, 60) connected to said auxiliary fan (36) comprise a first discharge pipe (60) for discharging air from said auxiliary fan (36) into said filter (32), and a second discharge pipe (39) for discharging air from said auxiliary fan (36) into the atmosphere.

9. Adjustable section powdered-paint spraying booth comprising;
   a fixed central body (1, 2) including ground-resting uprights (1) and connecting members (2), said connecting members (2) extending substantially horizontally between said uprights (1);
   two movable lateral walls (3, 4) located at opposite sides of said fixed central body (1, 2) and each including heads (3), longitudinal connecting members (4), and replaceable disposable sheets (27), said heads extending substantially parallel to said ground-resting uprights (1), said longitudinal connecting members (4) extending substantially parallel to said connecting members (2) and being connected to said heads (3), said sheets (27) being connected to said fixed central body (1, 2) and extending over said movable lateral walls (3, 4);
   a plurality of paint-spraying nozzles (14) connected to said lateral walls (3, 4) and penetrating said sheets (27);
   means (5, 6, 24) for tensioning said sheets (27) including motorized means (5, 6) for synchronously laterally moving said lateral walls (3, 4) towards and away from said fixed central body (1, 2);
   sheet supply rolls (19) connected to said fixed central body (1, 2);
   lower rollers (7) and upper rollers (8) connected to said central body (1, 2), and;
   sheet-receiving rollers (12) connected to said movable lateral walls (3, 4);
   wherein said sheets (27) each extend from one of said sheet supply rolls (19), over one of said upper rollers (8) and over one of said lower rollers (7), to one of said sheet-receiving rollers (12), and
   wherein said means (5, 6, 24) for tensioning said sheets (27) comprise motor means (24) for moving said sheet supply rolls (19) with respect to said central body (1, 2).

10. Adjustable section powdered-paint spraying booth according to claim 9, wherein said motor means (24) for moving said sheet supply rolls (19) with respect to said central body (1, 2) are synchronized with said motorized means (5, 6) for synchronously laterally moving said lateral walls (3, 4) towards and away from said fixed central body (1, 2).

11. Adjustable section powdered-paint spraying booth according to claim 9, further comprising cantilevered guides (13) connected to said fixed central body (1, 2), each of said sheet supply rolls (19) having a central axis (81) and ends bearing wheels (82), said wheels (82) being rotatable about said central axis (81) and movable along said cantilevered guides (13) for facilitating replacement of said sheet supply rolls (19).

12. Adjustable section powdered-paint spraying booth according to claim 11, further comprising cables (26) and reels (28), said reels (28) being connected to said motor means (24), said cables (26) supporting said sheet supply rolls (19) and being windable on said reels (28) upon actuation of said motor means (24).

13. Adjustable section powdered-paint spraying booth according to claim 9, further comprising a feeder (35) for feeding powdered paint to said plurality of paint-spraying nozzles (14), an intake (80) for paint to be recovered located downwardly within said central body (1, 2), a centrifugal separator (29) connected to said intake (80), a filter (32), and an air conveyance pipe (31) connecting said centrifugal separator (29) to said filter (32).

14. Adjustable section powdered-paint spraying booth according to claim 13, further comprising a fan (34) for expelling filtered air from said filter (32), an intermediate centrifugal separator (38) connected to said filter (32), pipes (37) for connecting said filter (32) to said feeder (35) via said intermediate centrifugal separator (38), an auxiliary fan (36) for maintaining a negative pressure within said intermediate centrifugal separator (38) for transferring powdered-paint collected at said filter (32) to said feeder (35), and air discharge means (39, 60) connected to said auxiliary fan (36).

15. Adjustable section powdered-paint spraying booth according to claim 14, wherein said air discharge means (39, 60) connected to said auxiliary fan (36) comprise a first discharge pipe (60) for discharging air from said auxiliary fan (36) into said filter (32), and a second discharge pipe (39) for discharging air from said auxiliary fan (36) into the atmosphere.

16. Adjustable section powdered-paint spraying booth comprising;
   a fixed central body (1, 2) including ground-resting uprights (1) and connecting members (2), said connecting members (2) extending substantially horizontally between said uprights (1);
   two movable lateral walls (3, 4) located at opposite sides of said fixed central body (1, 2) and each including heads (3), longitudinal connecting members (4), and replaceable disposable sheets (27), said heads extending substantially parallel to said ground-resting uprights (1), said longitudinal connecting members (4) extending substantially parallel to said connecting members (2) and being connected to said heads (3), said sheets (27) being connected to said fixed central body (1, 2) and extending over said movable lateral walls (3, 4);

a plurality of paint-spraying nozzles (14) connected to said lateral walls (3, 4) and penetrating said sheets (27);

means (5, 6, 24) for tensioning said sheets (27) including motorized means (5, 6) for synchronously laterally moving said lateral walls (3, 4) towards and away from said fixed central body (1, 2);

sheet supply rolls (19) connected to said fixed central body (1, 2);

lower rollers (7) and upper rollers (8) connected to said central body (1, 2), and;

sheet-receiving rollers (12) connected to said movable lateral walls (3, 4);

wherein said sheets (27) each extend from one of said sheet supply rolls (19), over one of said upper rollers (8) and over one of said lower rollers (7), to one of said sheet-receiving rollers (12), wherein said means (5, 6, 24) for tensioning said sheets (27) comprise motor means (24) for moving said sheet supply rolls (19) with respect to said central body (1, 2), and, wherein said motor means (24) for moving said sheet supply rolls (19) with respect to said central body (1, 2) are synchronized with said motorized means (5, 6) for synchronously laterally moving said lateral walls (3, 4) towards and away from said fixed central body (1, 2).

17. Adjustable section powdered-paint spraying booth according to claim 2, further comprising cables (26), reels (28), and cantilevered guides (13), said cantilevered guides (13) being connected to said fixed central body (1, 2), each of said sheet supply rolls (19) having a central axis (81) and ends bearing wheels (82), said wheels (82) being rotatable about said central axis (81) and movable along said cantilevered guides (13) for facilitating replacement of said sheet supply rolls (19), said reels (28) being connected to said motor means (24), said cables (26) supporting said sheet supply rolls (19) and being windable on said reels (28) upon actuation of said motor means (24).

18. Adjustable section powdered-paint spraying booth according to claim 16, further comprising a feeder (35) for feeding powdered paint to said plurality of paint-spraying nozzles (14), an intake (80) for paint to be recovered located downwardly within said central body (1, 2), a centrifugal separator (29) connected to said intake (80), a filter (32), and an air conveyance pipe (31) connecting said centrifugal separator (29) to said filter (32).

19. Adjustable section powdered-paint spraying booth according to claim 18, further comprising a fan (34) for expelling filtered air from said filter (32), an intermediate centrifugal separator (38) connected to said filter (32), pipes (37) for connecting said filter (32) to said feeder (35) via said intermediate centrifugal separator (38), an auxiliary fan (36) for maintaining a negative pressure within said intermediate centrifugal separator (38) for transferring powdered-paint collected at said filter (32) to said feeder (35), and air discharge means (39, 60) connected to said auxiliary fan (36).

20. Adjustable section powdered-paint spraying booth according to claim 19, wherein said air discharge means (39, 60) connected to said auxiliary fan (36) comprise a first discharge pipe (60) for discharging air from said auxiliary fan (36) into said filter (32), and a second discharge pipe (39) for discharging air from said auxiliary fan (36) into the atmosphere.

* * * * *